(12) United States Patent
Seth et al.

(10) Patent No.: US 6,859,674 B1
(45) Date of Patent: Feb. 22, 2005

(54) METHOD FOR DESIGNING AND ACQUIRING A MACHINING SYSTEM BASED UPON PERFORMANCE CHARACTERISTICS

(75) Inventors: Brij B. Seth, Canton, MI (US); Youssef A. Hamidieh, Bloomfield Hills, MI (US); Balachandra Muniyappa, Westland, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/560,607

(22) Filed: Apr. 28, 2000

(51) Int. Cl.[7] ............................................. G06F 19/00
(52) U.S. Cl. ......................... 700/97; 700/108; 702/186
(58) Field of Search .................... 700/97, 108, 160, 700/173, 174, 193; 702/182, 183, 184, 186, 56

(56) References Cited

U.S. PATENT DOCUMENTS

| | | | | |
|---|---|---|---|---|
| 4,215,959 A | * | 8/1980 | Deprez | 409/10 |
| 4,985,857 A | * | 1/1991 | Bajpai et al. | 702/184 |
| 5,662,438 A | * | 9/1997 | Wiener et al. | 409/26 |
| 5,663,894 A | * | 9/1997 | Seth et al. | 702/56 |
| 5,757,662 A | * | 5/1998 | Dyer et al. | 700/279 |
| 5,876,155 A | * | 3/1999 | Link et al. | 408/1 R |
| 6,289,735 B1 | * | 9/2001 | Dister et al. | 73/579 |
| 6,463,352 B1 | * | 10/2002 | Tadokoro et al. | 700/169 |
| 6,484,109 B1 | * | 11/2002 | Lofall | 702/56 |

\* cited by examiner

Primary Examiner—Leo Picard
Assistant Examiner—Chad Rapp
(74) Attorney, Agent, or Firm—David B. Kelley

(57) ABSTRACT

A method for designing and acquiring a machine by the use of benchmark machines which perform a certain function or operation in a desired manner. Certain locations are analyzed on the benchmark machines and vibration measurements and/or impact tests conducted on these locations which allow certain attributes or characteristics to be respectively assigned to these locations. The new machine is designed to improve upon these respective characteristics or attributes, thereby performing the operation in a highly accurate and reliable manner.

26 Claims, 7 Drawing Sheets

METHOD FOR DESIGNING AND ACQUIRING A MACHINING SYSTEM BASED UPON PERFORMANCE CHARACTERISTICS

(1) FIELD OF THE INVENTION

This invention generally relates to a method for designing and acquiring a machine system based upon performance characteristics and more particularly, to a method for designing and acquiring a machine tool based upon benchmarking of existing machine tools which operatively reside within a manufacturing facility or plant or outside at a supplier's floor, such benchmarking being accomplished by respectively placing these machine tools in an idle state or condition and in an operative or "loaded" state or condition and noting the response vibrations associated with operation and/or acquired from impact testing. The invention further relates to designing and acquiring or purchasing a machine or a machine system (i.e., a machine having several interconnected components) having certain desirable characteristics and attributes which substantially insures that such a machine system has a certain desired structural integrity associated with the assembly comprising a tool holder, spindle, slides, gibs, ball screw or linear motor drive, fixturing elements, and machined components together with the machine bed.

(2) BACKGROUND OF THE INVENTION

Machine tools are used to perform a wide variety of machining tasks such as, and without limitation, creating an item and/or "machining" or frictionally engaging an item or "workpiece" in order to shape the item in some desired manner.

Typically, a "transfer line" type machine is adapted or "designed" to perform a single task or function while machining centers or assemblies are capable of being selectively programmed to perform a variety of different types of machining operations.

For example, one type of transfer line machine tool includes a selectively movable spindle which is adapted to selectively receive a tool and to rotate the tool as the tool selectively engages the workpiece or item, effective to "machine" or shape the workpiece or item in a desired manner. The "shaped" item may then be transported to another machine where it is subjected to further machining or another type of operation. Hence, several dissimilar machines may be employed within an overall process to cooperatively produce such a desired item and/or to cooperatively perform some desired machining tasks on a component. Such machining operations may comprise a number of widely varying or different types of operations which are performed upon the component, such as drilling or face milling. Alternatively, these operations may be substantially similar but may be selectively performed at different depths of the component and/or cause the component to be cut at different depths and/or may utilize different machining parameters in order to acquire the desired surface finish characteristics. Examples of such operations include face milling, roughing, semi-finish and finishing operations. Moreover, it is also relatively likely that in a relatively high volume production environment, a complete machining operation on a component is performed by more than one machining center and with more than one "set-up".

The ability of a machine tool to accurately and desirably perform its respective function is typically dependent upon certain attributes or characteristics associated with the machine tool and/or certain attributes and/or characteristics associated with the various components of the machine tool. Such components typically comprise a tool holder, spindle, slides, gibs, ball screw or linear motor drive, fixturing elements, and machined components together with machine bed. Moreover, the quality of the machined components is typically dependent upon the characteristics of the integral or overall "system" of the machining tool which is comprised of many different and diverse types of interconnected elements and/or components. For example, machine tool components having high stiffness and low vibration characteristics typically enable a machine tool to perform a task in a more accurate and reliable manner. Thus, a large variance exists between machine tools which are adapted to perform the same overall task or function but which are manufactured or produced by different manufacturers, which have a respectively different configuration or design, and which are constructed or created by use of a diverse array of different components.

The process or methodology for designing and/or acquiring a machine tool is relatively and typically complicated due to the large number of interconnected components which are employed within the machine and the relatively intricate functional relationship required of these components. The use of such a large number of interconnected components reduces the likelihood that the overall function or task performed by the machine tool is optimized (i.e., is reliably and repeatably performed with a certain accuracy) across different machine tools. Further, since the overall performance of a machine tool varies as it is used due to, by way of example and without limitation, component wear, or structural fatigue, it is difficult to ascertain whether a certain newly manufactured machine will reliably and repeatably perform a certain function, task, and/or operation in a desired manner during its entire operating life or during some other predetermined interval of time.

There is therefore a need for an effective benchmarking of existing machine tools and/or components which are operatively disposed within a manufacturing facility and/or plant and which have enhanced and/or desirable performance characteristics together with certain "sub-par" or undesirable capabilities and/or characteristics in order to derive design criteria for the fabrication and assembly of different components of the machine tool in an efficient and cost effective manner. There is also a need for a method for providing a machining system which accomplishes a desired task, operation, or function in a substantially and highly accurate manner during its operating life. There is also a need for a method for evaluating certain characteristics or attributes of a machine tool before such a machine tool is purchased, or after it is purchased but before it is shipped to a certain manufacturing plant, in order to substantially increase the likelihood that a machine that is purchased or is acquired by a business organization, will meet the needs and requirements of the organization and, more particularly, will continue to perform a function, task, and/operation in a desired manner during its operating life.

SUMMARY OF THE INVENTION

It is a first object of the present invention to provide a method for designing and acquiring a machine based on benchmarking of existing machines which are operatively disposed within a manufacturing plant or at a supplier's floor under idle and machining loads, and further based upon an analysis of the response characteristics of some or all the various machines components operatively contained within the machine.

It is a second object of the present invention to provide a method for efficiently designing a machine tool in a manner which overcomes the various and previously delineated drawbacks of prior methods.

It is a third object of the present invention to provide a method for designing a machine tool having an assemblage of different sub-components which cooperatively perform a certain function, operation, and/or task in a desired manner.

It is a fourth object of the present invention to provide a method for reliably evaluating a machine tool, effective to allow a machine tool to be acquired or purchased by a business organization in a manner which substantially ensures that the machine will meet the needs and the requirements of the purchaser.

According to a first aspect of the present invention, a method is provided for benchmarking and characterizing existing machine tools and components of machine tools with enhanced performance for producing quality parts and extended machine uptime and durability and those which do not perform adequately in order to establish design criteria for cost effective and efficient design and fabrication. The method includes the steps of: identifying target machines; on each machine tool performing stiffness characterization of different components with impact testing or static force loading; on each machine tool operating the spindles at rated speed while idle (no cutting) and capturing vibration signatures on spindle housing in the different directions; on each machine tool, performing normal machining operation and capturing the vibration signatures for the entire machining cycle on different components of the machine tool and in different directions; analyzing the stiffness data for the different components and the vibration data in time and frequency domain; repeating the process on other benchmark machine tools; tabulating the results for all the machine tools and components with enhanced performance characteristics and with deficient characteristics; establishing cost effective/efficient design criteria for the critical machine tool components based on stiffness and vibration characteristics; establishing a machine tool design iteration loops for all the critical components consisting of a proposed design followed by Finite Element Analysis (FEA), or other structural CAE analysis followed by design modifications based on deficient findings. Then following this by another round of structural analysis; fabricating the sub-components and impact testing the critical sub-components at suppliers floor before assembly; and assembling the machine tool and characterizing it with stiffness testing and capturing the vibration signatures and comparing with desirable machine tool requirements.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
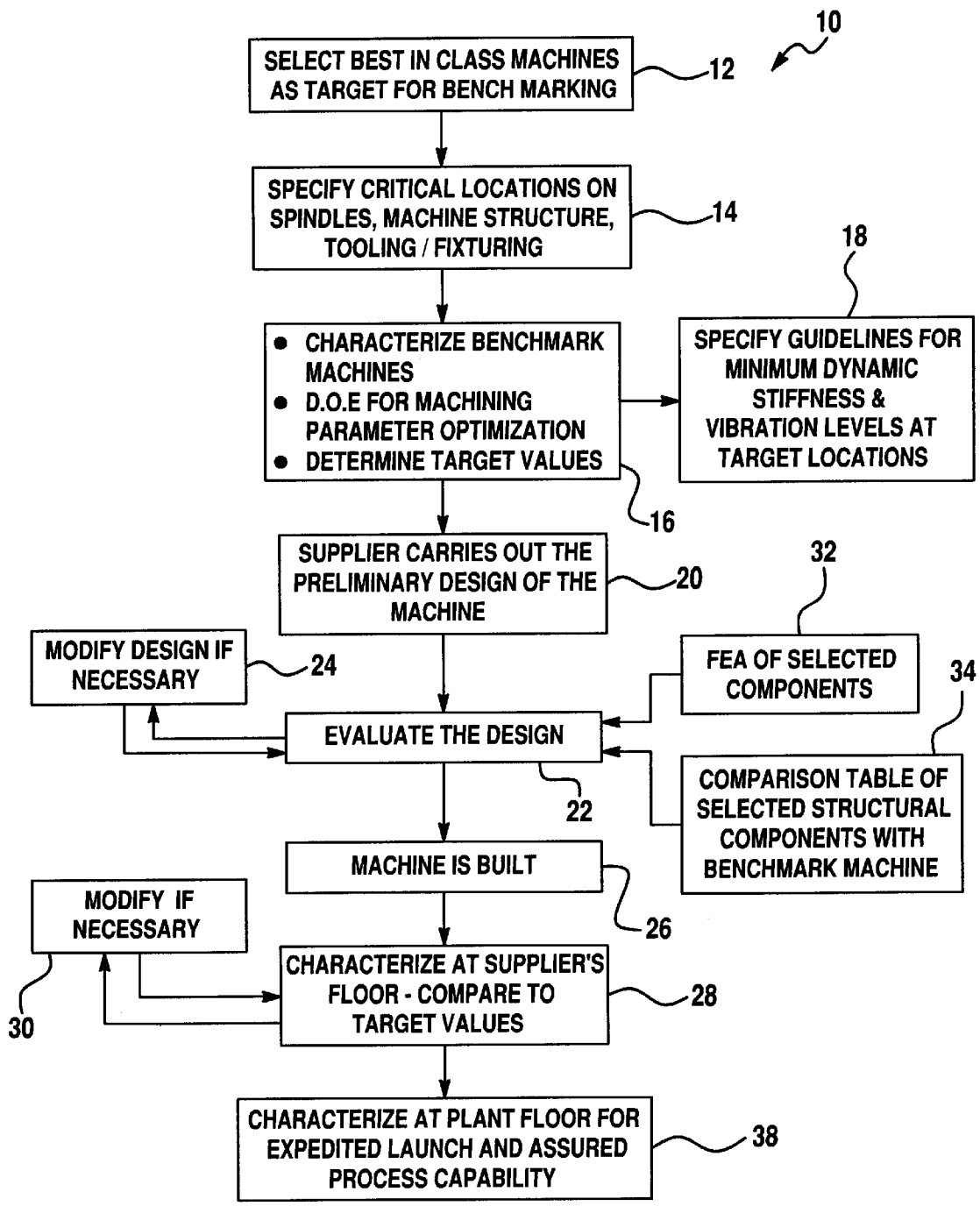
FIG. 1 is a flowchart illustrating a sequence of steps comprising the methodology of the preferred embodiment of the invention.

Referring now to FIG. 1, there is shown a flowchart 10 comprising and/or illustrating the sequence of steps associated with the methodology of the preferred embodiment of the invention.

Particularly, flowchart 10 includes a first step 12 in which one or more "target" machines are selected which have been previously purchased or acquired and/or analyzed over some predetermined period of time and which were found to perform a desired function or operation in an acceptable manner.

In the preferred embodiment of the invention, the selected machines have enhanced performance characteristics which allow the machines to produce quality parts and have "extended machine uptime" and durability attributes (i.e., the machines are respectively able to operate for a relatively long period of time without requiring maintenance or experiencing failure). These machines may be referred to as the "benchmark" machines. As is more fully and completely delineated below, it will be these machines which will be used to design a new machine (e.g., to select and assemble various sub-components to form a new machine) in a manner which will allow the newly designed machine to have certain desired characteristics and attributes which will allow the newly designed machine to perform these operations even more accurately and reliably than the benchmark machines. Hence, by beginning the machine design process with a previously designed machine, which is known to operate in a desirable manner, one is able to greatly enhance the overall machine design process by providing design criterias and improve upon an even previously acceptable operating performance. Moreover, this process also allows components, operatively residing within the benchmark machines to be modified in a manner which allows the benchmark machines to perform in a superior or "enhanced" manner.

In one non-limiting embodiment of the embodiment, other machines having "sub-par" performance characteristics are also analyzed and compared with those benchmark machines having respectively desired performance characteristics in order to establish design criteria for the cost effective and efficient design and/or acquisition of new machines or for improving performance of the existing "sub-par" machines.

Figure 2:
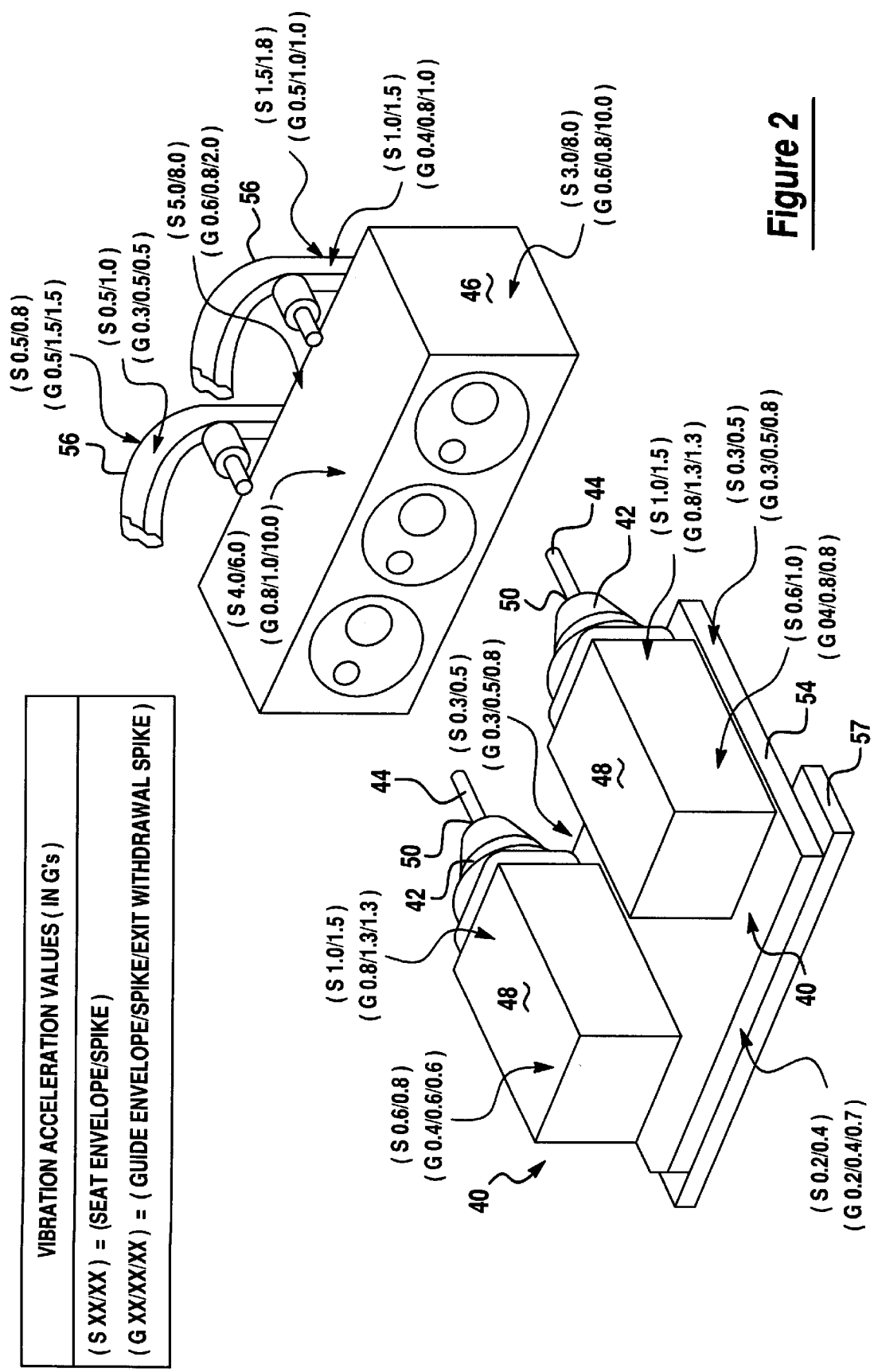
FIG. 2 is block diagram of a specific valve seat and guide machining process machine as an example which is selectively used to provide desirable vibration performance data based on benchmarking in accordance with the methodology of the preferred embodiment of the invention.

One non-limiting example of one such benchmark machine is shown in FIG. 2. As shown, machine 40 includes a selectively movable or rotatable spindle 42 which is adapted to selectively receive a tool 44 and which selectively moves and/or rotates the received tool 44 against a workpiece 46 in order to shape or form the workpiece 46 in a desired manner. As shown, workpiece 46 is typically clamped or mounted to a fixture 56 in a conventional manner. The spindle housing 48 rests upon a machine slide 54, which is typically and movably mounted to a machine base 57. The machining operations or processes may include the performance of different operations upon the workpiece 46, such as and without limitation, drilling or face milling. Alternatively, based upon requirements, substantially the same machining operations are performed at different depths of "cut" within workpiece 46 and by use of different machining parameters in order to acquire the desired surface finishes. Examples of such operations include face milling, roughing, semi-finish and finishing type operations. In a typical machining facility, a complete machining process which is performed upon workpiece 46 may be accomplished at more than one machining center or station and with more than one "set-up" or machine. Additionally, each machine and/or machining center may be selectively programmed to perform different machining operations. It should be appreciated that other types of machines may be used as a benchmark machine by the methodology of the preferred embodiment of the invention, and nothing in this Application should restrict the methodology of the preferred embodiment of the invention to the machine or the type of machine which is shown in FIG. 2.

Figure 3:
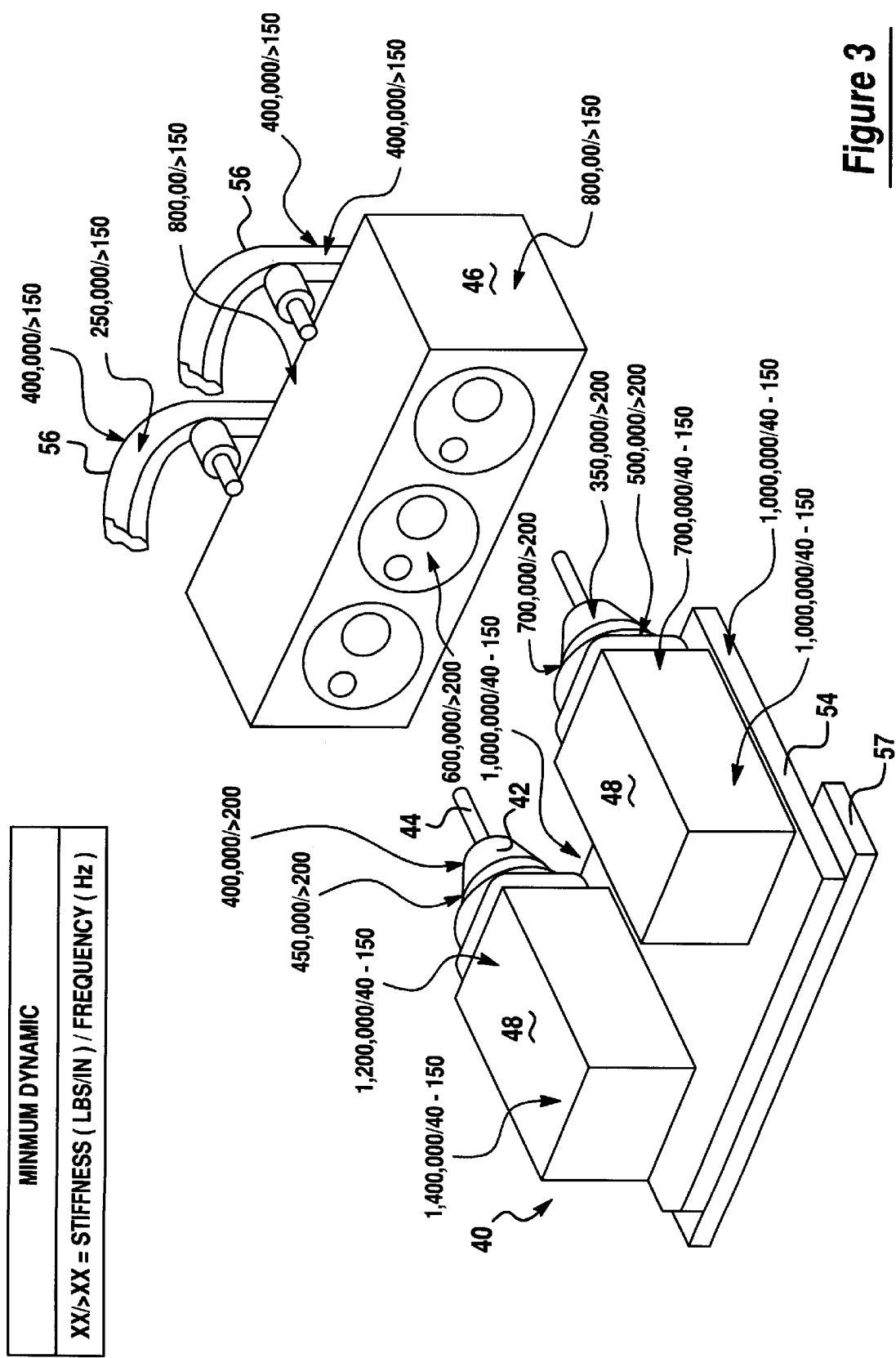
FIG. 3 is a block diagram of a specific valve seat and guide machining process machine as an example which is shown in FIG. 2 and which is selectively used to provide desirable stiffness performance data based on benchmarking in accordance with the methodology of the preferred embodiment of the invention.

Step 14 follows step 12 and in this step "target" locations, areas or components of the benchmark machine 40 are chosen for sensor locations, data capture, and vibration and dynamic stiffness analysis. In one non-limiting embodiment, these areas or locations include the area or location 50 in which the machine 40 receives tool 44. Different areas, locations and/or components of machine 40 may be used for this characterization (e.g., tool holders, spindle, slides, gibs, ball screws, linear motor drives fixturing elements, and other portions of machine 40 having attributes or characteristics which effect the quality of machined components). Moreover, in another non-limiting embodiment, a machine location or area is typically chosen for characterization if it "interfaces with" or receives another section or portion of the machine and/or if it physically moves or controls the movement of a tool or other object which is used to perform some desired function or action. Various desirable or benchmark vibration levels for the machine 40 are shown in FIG. 2 and various desirable or benchmark minimum dynamic stiffness levels for machine 40 are shown in FIG. 3. Also respectively shown in FIGS. 2 and 3, are the benchmark vibration and stiffness levels of the fixture 56 and workpiece 46.

Step 16 follows step 14, and in this step, these attributes or characteristics (i.e., vibration and stiffness) are measured, assigned, and associated with each of the locations/components which are identified in step 14. Particularly, in one non-limiting embodiment of the invention, the amount of minimum dynamic stiffness and operational vibration are two attributes which are measured for each location/component which is specified in step 14 (e.g., components having a relatively high stiffness and low vibration characteristics are desired). In one non-limiting embodiment, a "stiffness" characterization of different components is performed on each machine by impact testing and/or static force loading. The vibration characterization may be established by use of a vibration sensor. Creation of these characterizations are shown more fully below.

Figure 4A:
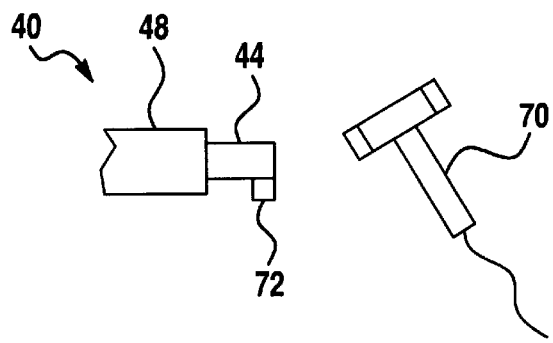
FIGS. 4(a)–(g) illustrate an impact test which is performed upon the machine shown in FIGS. 2 and 3, and the resulting stiffness analysis which is performed in accordance with the methodology of the preferred embodiment of the invention.
Figure 4B:
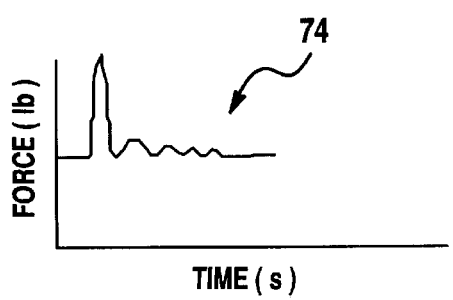
Figure 4C:
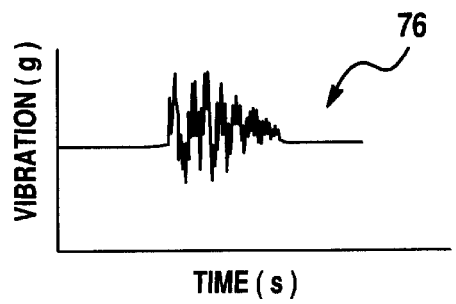
Figure 4D:
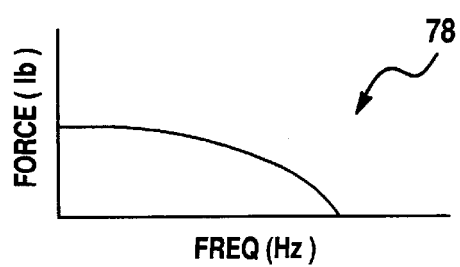
Figure 4E:
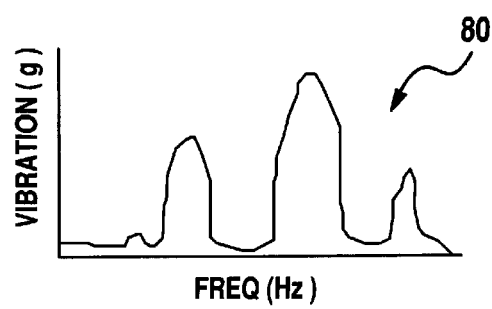
Figure 4F:
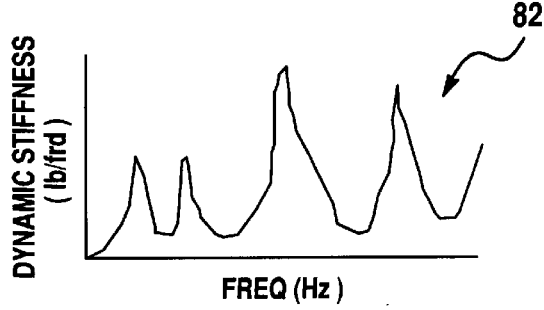
Figure 4G:
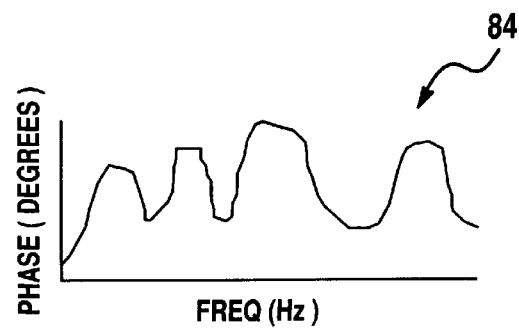

One example of a "stiffness" characterization or impact test on a machine 40 is illustrated in FIGS. 4(a)–(g). Particularly, as shown in FIG. 4(a), a calibrated hammer 70 having a force transducer is used to impact or strike various portions of the machine 40, such as the tool 44 with a certain predetermined force which is measured and recorded by the transducer. A conventional sensor 72 (e.g., an accelerometer or other vibration sensor) is operatively disposed on the tool 44 and measures the vibration response or characteristic of the tool 44 when struck by the hammer 70. Graphs 74–84 represent values measured during the "impact" test. Particularly, graph 74 of FIG. 4(b) illustrates the force input measured by the transducer; graph 76 of FIG. 4(c) illustrates the vibration response of the tool measured by sensor 72; graph 78 of FIG. 4(d) illustrates the force spectrum of the impact; graph 80 of FIG. 4(e) illustrates the vibration spectrum of the response; graph 82 of FIG. 4(f) illustrates dynamic stiffness magnitude plotted against frequency; and graph 84 of FIG. 4(g) illustrates the phase characteristic of the signal. Graphs 74–84 cooperatively provide a measure of the dynamic stiffness of the portion of the tool 72 which is impacted by the hammer 70. In this manner, the stiffness of the tool 44 may be analyzed. Similarly, the stiffness of the other respectively impacted locations may also be achieved.

Figure 5A:
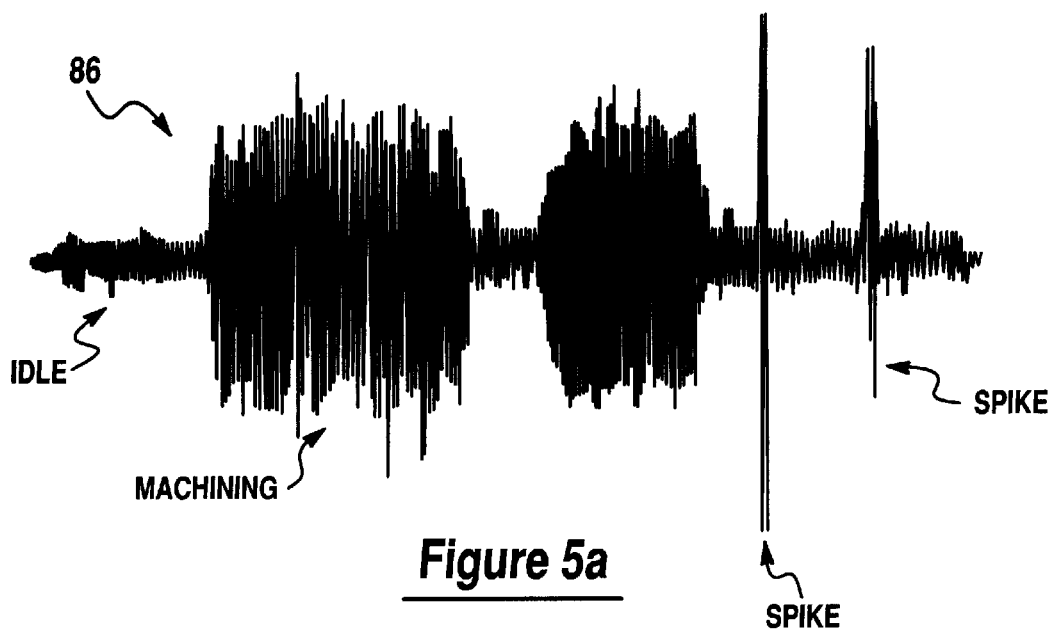
FIGS. 5(a)–(c) illustrate a vibration test which is performed upon the machine shown in FIGS. 2 and 3 and the resulting vibration analysis which is performed in accordance with the methodology of the preferred embodiment of the invention.
Figure 5B:
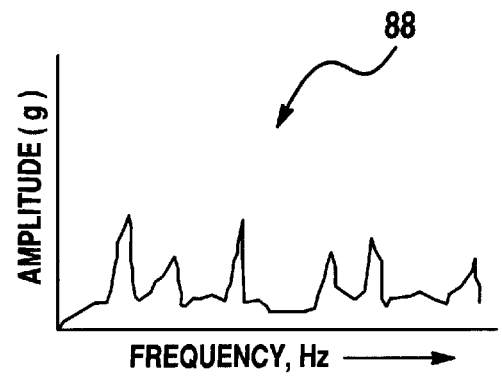
Figure 5C:
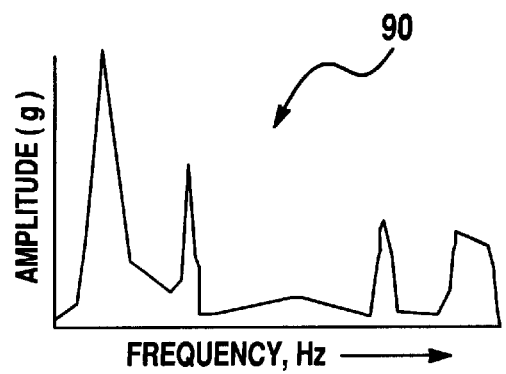

Referring now to FIGS. 5(a)–(c), in one non-limiting embodiment, the vibration signature or response for the "target" machines 40 is also measured in step 16 at each of the various locations shown in FIG. 2.

Particularly, as shown in FIG. 5(a), the vibration signature or response for machine 40 (e.g., for the integral machine or system and/or for different components or areas of the machine) is measured in a conventional manner (e.g., by the use of a vibration sensor) while machine 40 is operated at rated speeds while machine 40 is idling (e.g., not cutting), and while machine 40 is performing machining operations over the entire machining cycle and in different directions. A time domain analysis 86 of the vibration signature of the integral system is illustrated in FIG. 5(a). Graph 88 of FIG. 5(b) illustrates a frequency domain analysis of the integral system response while machine 40 is idling, and graph 90 of FIG. 5(c) illustrates a frequency domain analysis of the integral system response while machine 40 is performing a machining operation. In this manner, the vibration level at various portions or locations of the machine 40 may be analyzed.

Based upon these measured attributes and characteristics, in step 18, the "benchmark" or "minimum dynamic stiffness and vibration guidelines" which are used to design the new machine are established. That is, the stiffness data and the vibration data for the different locations and/or components is analyzed for the tools/machines having enhanced performance characteristics and for those with deficient characteristics. In the preferred embodiment of the invention, the new machine must typically perform substantially the same task or function as the benchmark machine but having certain characteristics or attributes which improve upon the measured characteristics or attributes in step 16. In one non-limiting embodiment, the new machine may be a substantial replica of the benchmark machine but differing from the benchmark machine at those target locations or components in order to allow or cause these areas or locations, on the new machine, to have attributes or characteristics which allow the new machine to perform its function in a more accurate and reliable manner than the benchmark machine. Moreover, the foregoing analysis allows a business enterprise to modify a component and/or a portion of the benchmark machine in order to enhance the performance of the benchmark machine.

Hence, in step 20 a design of the new machine is accomplished by use of the benchmark machine and by modifying the material, structure, and/or shape or geometry of the respective locations, such as location 50, 52, and 42 of the benchmark machine or the new machine to improve upon the stiffness and reduce or minimize respective operational vibration (i.e., these respective locations 50, 52, 42 may have an increased thickness over those locations 50, 52, 42 on the benchmark machine in order to increase stiffness). In the preferred embodiment, the stiffness and vibration characteristics are used to establish cost effective and efficient design criteria for the new machine and/or for components of the new machine.

Step 22 follows step 20, and in this step, the new design is evaluated by use of a computer simulation and/or computer aided design system in order to determine whether the new design does provide these improved attributes and characteristics. Particularly, during the design process a Finite Element Analysis 32 or other structural analysis may be accomplished upon these components, locations or areas 42, 50 and 52 of the new machine, and in step 34, is compared with a similar Finite Element Analysis which may be accomplished on the benchmark machine at similar or analogous components or locations. The design is modified in step 24, if necessary, based on deficient findings, to further improve upon these attributes and characteristics and an evaluation is accomplished on this new design. The structural analysis, (e.g., steps 22, 32, 34, 24) may be repeated several times on the modified design until a satisfactory design is achieved.

After the design appears to produce a machine having attributes and/or characteristics which allow it to operate in a superior manner to the benchmark machine, step 22 is followed by step 26 in which the machine is actually built or constructed. In one non-limiting embodiment, the subcomponents of the machine are built first and tested (e.g., impact tested) before assembly of the entire machine. Step 28 follows step 26, and in this step, the machine is tested in a launch or staging area or supplier's floor in order to simulate the operational environment in which the machine is to be utilized. In the preferred embodiment, the assembled machine is characterized with stiffness testing and capturing the vibration signatures and comparing the results with desirable machine tool requirements. Step 30 follows step 28, and in this step, the machine is modified, if necessary, to further improve upon the operational performance of the machine. Step 38 follows step 28, and requires that the machine be tested on the plant floor or the actual operating environment in which the machine is to be used. After the machine has been tested, it may be purchased or acquired by a business organization. In this manner, a business organization is substantially assured that it is acquiring a machine which will meet its needs and reliably perform a desired function.

Figure 6:
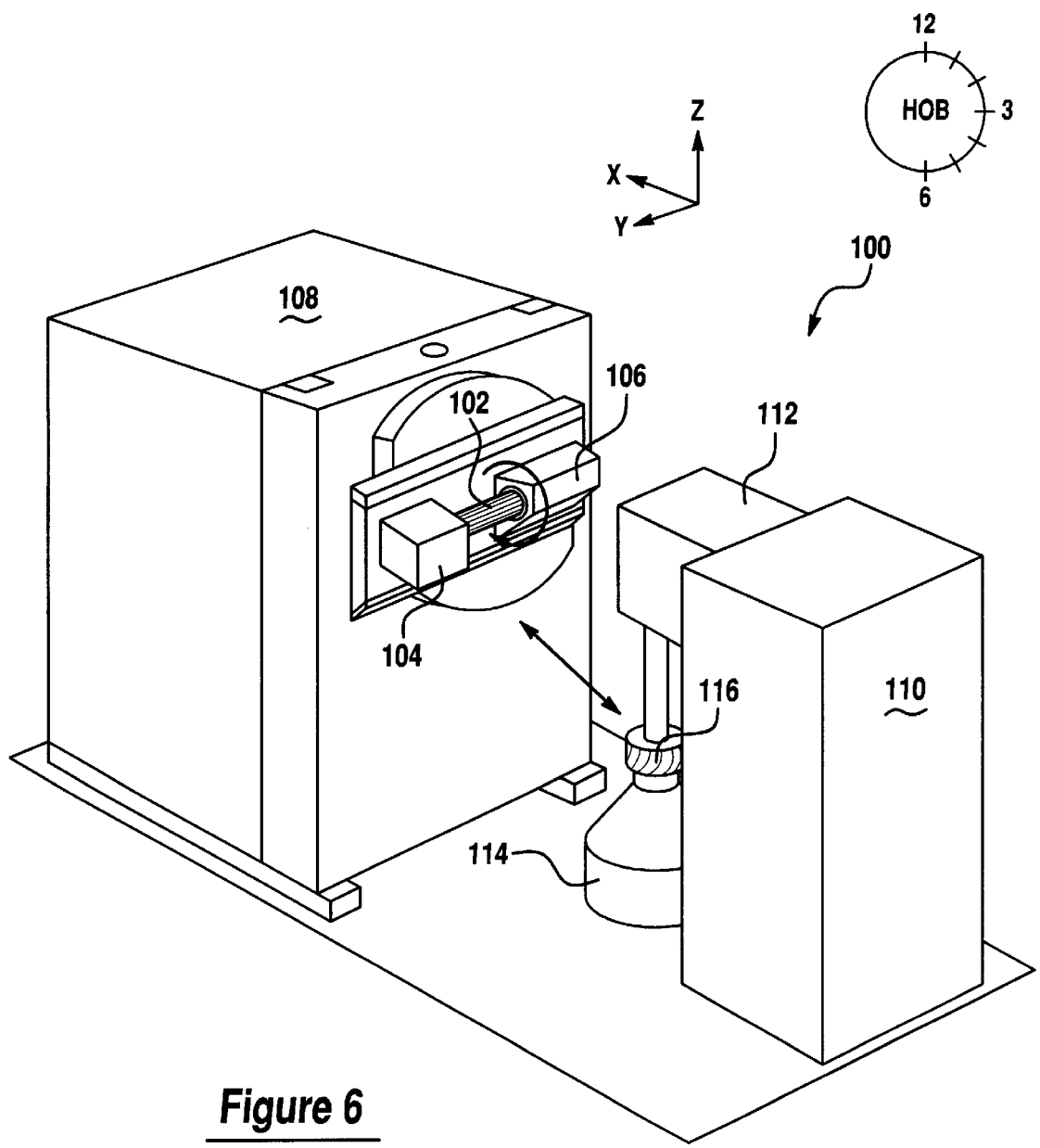
FIG. 6 is a perspective view of a conventional hobbing machine to which the methodology of the preferred embodiment of the invention has been applied.
Figure 7:
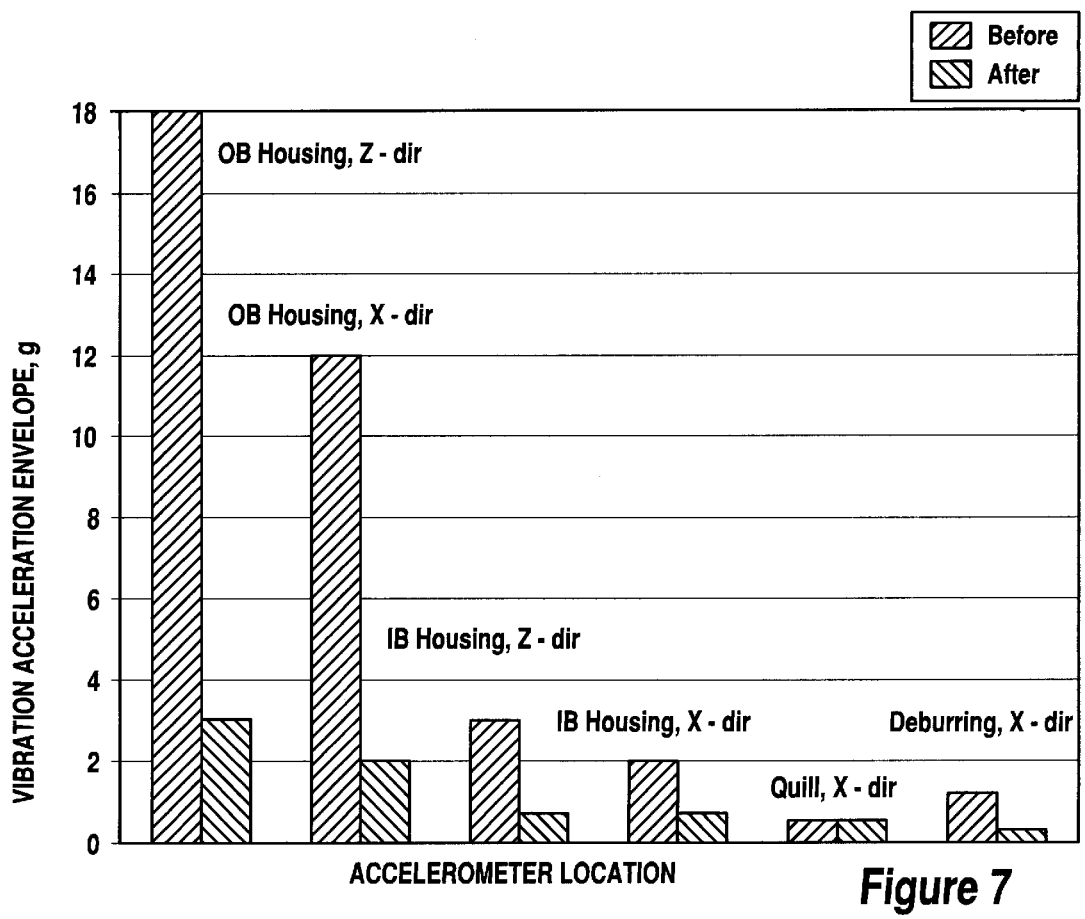
FIG. 7 is a graph comparing various vibration values associated with the hobbing machine shown in FIG. 6 before and after the methodology of the preferred embodiment of the invention has been applied to the machine.
Figure 8:
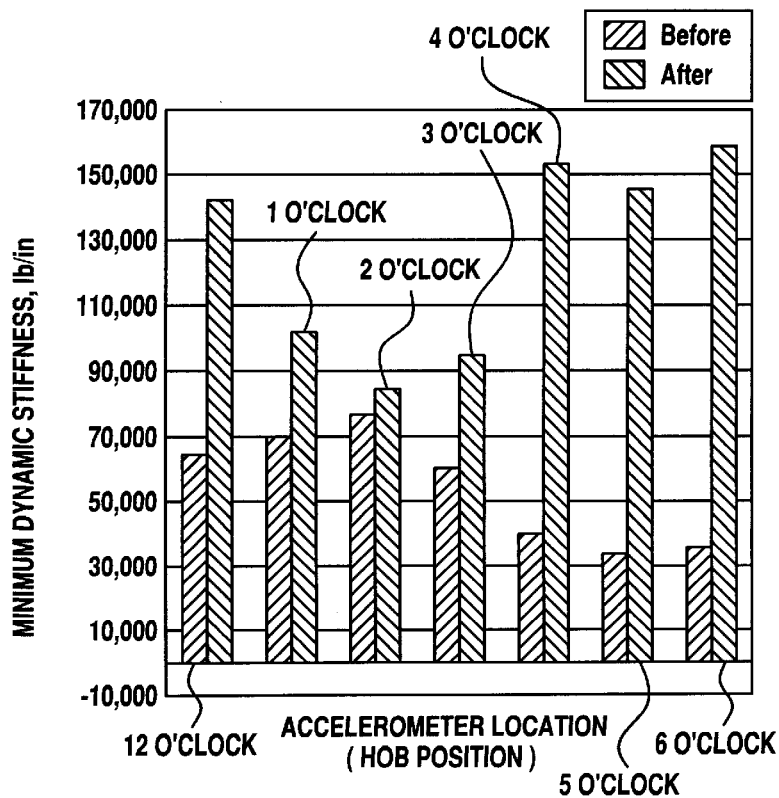
FIG. 8 is a graph comparing various minimum dynamic stiffness values of the hobbing machine which is shown in FIG. 6, before and after the methodology of the preferred embodiment of the invention has been applied to the machine.

The efficiency of the methodology 10 may best be shown by reference to FIGS. 6–8. Particularly, as best shown in FIG. 6, a typical hobbing machine 100 may be initially benchmarked. Particularly, hobbing machine 100 includes a selectively movable hob portion 102 which is movably coupled to a first or "outboard" bearing and housing 104 and to a second or "inboard" bearing and housing 106. Units 104 and 106 are coupled to a portion 108 of machine of machine 100. Further, machine 100 includes a second portion 110 having a quill support member or portion 112 which is adapted to cooperate with a lower spindle 114 to receive a workpiece 116. In operation, one of the members of portions 108 may be moved relative to the other portion, thereby allowing the hob portion 102 to selectively contact the workpiece 116.

As shown best in FIG. 7, the vibration level of the bearing housings 104 (i.e., "OB Housing") and 106 (i.e., "IB Housing") are reduced in the various directions or axes illustrated in FIG. 6, as are the vibration of the quill 112 and the deburring tool (not shown) by applying the methodology of the preferred embodiment of the invention to the machine 100. Further, as best shown in FIG. 8, the stiffness of the hobbing tool is also improved at each position shown in FIG. 6 form 12 o'clock to 6 o'clock by applying the methodology of the preferred embodiment of the invention to the machine 100.

It should be appreciated that the present method may be used with virtually any type of machine, including but not limited to, "plunge cut" machines and hobbing machines. It should further be understood that the invention is not limited to the exact construction and method which has been previously delineated but that various changes and modifications may be made without departing from the spirit and the scope of the inventions as are more fully delineated in the following claims.

What is claimed is:

1. A method for designing and acquiring a machine comprising the steps of:

identifying at least a first machine;

operating said at least said first machine;

testing said at least said first machine;

acquiring data by said testing of said first machine;

designing a second machine by use of said data;

building said second machine;

evaluating said second machine by the use of said data, wherein the step of evaluating said second machine further has the step of performing a finite element analysis of said second machine using the said data; and acquiring said second machine based upon said evaluation.

2. The method of claim 1 further comprising the step of:

modifying said second machine to meet certain performance criteria obtained from said evaluation.

3. The method of claim 2 when said first machine has a certain stiffness and wherein second data further comprises a measure of said stiffness.

4. The method of claim 3 wherein a portion of said second machine receives a tool and wherein said portion vibrates by a certain amount and has a certain stiffness, and wherein said second data comprises said stiffness of said portion and a measure of said vibration of said portion.

5. The method of claim 3 further comprising the steps of:

placing said second machine in a launch area;

operating said second machine;

acquiring third data by operating said second machine;

comparing said third data to said second data; and modifying said second machine based upon said comparison.

6. The method of claim 5 further comprising the steps of:
placing said second machine within a manufacturing plant;
operating said second machine;
acquiring fourth data by operating said machine within said manufacturing plant;
comparing said fourth data to said second data; and
modifying said second machine based upon said comparison of said fourth data with said second data.

7. The method of claim 3 wherein said stiffness is measured by use of a static force loading test.

8. The method of claim 1 wherein a plurality of machines comprises plunge cut machines.

9. The method of claim 1 wherein a plurality of machines comprises hobbing machines.

10. The method of claim 1 further comprising the step of:
modifying the second machine in accordance with results of the finite element analysis.

11. The method of claim 10 further comprising the step of:
modifying a material used in the design of the second machine.

12. The method of claim 10 further comprising the step of:
modifying a structure used in the design of the second machine.

13. The method of claim 10 further comprising the step of:
modifying a shape used in the design of a portion of the second machine.

14. The method of claim 10 further comprising the step of:
increasing a thickness of a portion of said second machine.

15. A method for designing a machine comprising the steps of:
select a first machine;
specify at least one location on said first machine;
characterizing said at least one location by a first value;
designing a second machine having a second location;
characterizing said second location by a second value, wherein the second value may be determined by using static force loading;
comparing said second value with said first value using finite element analysis to improve design characteristics of the second machine; and
approving said design based upon said comparison of said first value with said second value.

16. The method of claim 15 when said first machine has a certain stiffness at said at least one location and wherein said first value is substantially equal to said certain stiffness.

17. The method of claim 15 when said first machine vibrates by a certain amount at said at least one location and wherein said second value is substantially equal to said certain amount.

18. The method of claim 15 further comprising the steps of building said second machine; testing said second machine in order to measure said second value; and acquiring said second machine only if said measured second value resides below a certain threshold value.

19. A method for purchasing a machine comprising the steps of:
selecting a benchmark machine which selectively performs a desired function;
identifying a certain first portion of said benchmark machine;
measuring a certain attribute level of said first portion using at least one of a static force loading test and an impact test; and
designing a second machine which is substantially similar to said benchmark machine and which includes a first portion which differs from said first portion of said benchmark machine using finite element analysis, effective to allow said second machine to perform said desired function in a reliable and accurate manner wherein the step of designing said second machine comprises the step of modifying at least one of a material, a structure, and a shape used in the design of said second machine to improve upon at least one attribute of said benchmark machine.

20. The method of claim 19 wherein said certain attribute level comprises stiffness.

21. The method of claim 19 wherein said certain attribute level comprises an amount of vibration.

22. The method of claim 21, wherein said certain attribute level is measured by use of an impact test.

23. The method of claim 21 wherein said certain attribute level is measured by measuring vibration levels while said benchmark machine is idling a nd performing machining operations.

24. The method of claim 19 wherein said certain said portion of said benchmark machine comprises a tool reception portion.

25. The method of claim 19 wherein said benchmark machine comprises a spindle and wherein said certain portion comprises said spindle.

26. The method of claim 19 wherein said benchmark machine comprises a hobbing machine.

* * * * *